US012549893B2

(12) United States Patent
Grimani

(10) Patent No.: US 12,549,893 B2
(45) Date of Patent: Feb. 10, 2026

(54) LOUDSPEAKER SYSTEM FOR REFLECTION-BASED IMAGING

(71) Applicant: Performance Media Industries, Ltd., Novato, CA (US)

(72) Inventor: Anthony Grimani, Novato, CA (US)

(73) Assignee: Performance Media Industries, Ltd., Novato, CA (US)

( * ) Notice: Subject to any disclaimer, the term of this patent is extended or adjusted under 35 U.S.C. 154(b) by 152 days.

(21) Appl. No.: 18/398,044

(22) Filed: Dec. 27, 2023

(65) Prior Publication Data

US 2024/0223944 A1 Jul. 4, 2024

Related U.S. Application Data

(60) Provisional application No. 63/477,525, filed on Dec. 28, 2022.

(51) Int. Cl.

| | |
|---|---|
| ***H04R 1/34*** | (2006.01) |
| ***H04R 3/12*** | (2006.01) |
| *H04R 1/02* | (2006.01) |

(52) U.S. Cl.

CPC ............... *H04R 1/345* (2013.01); *H04R 3/12* (2013.01); *H04R 1/025* (2013.01); *H04R 2201/021* (2013.01); *H04R 2203/12* (2013.01)

(58) Field of Classification Search

CPC .................................. H04R 1/345; H04R 3/12

See application file for complete search history.

(56) References Cited

U.S. PATENT DOCUMENTS

| | | | | |
|---|---|---|---|---|
| 12,262,186 | B2 * | 3/2025 | Meyer | H04R 1/30 |
| 2021/0235192 | A1 * | 7/2021 | Healy | H03F 1/52 |
| 2021/0409866 | A1 * | 12/2021 | Orth | G10K 11/17857 |
| 2024/0323638 | A1 * | 9/2024 | Nielsen | H04R 5/02 |
| 2024/0340607 | A1 * | 10/2024 | Oellers | H04S 7/302 |

* cited by examiner

*Primary Examiner* — Olisa Anwah

(74) *Attorney, Agent, or Firm* — Andrew F. Young, ESQ.; NOLTE LACKENBACH SIEGEL

(57) ABSTRACT

An electro-acoustic system including at least one directional transducer unit configured to generate a controlled sound radiation beam aimed at a reflection surface to bounce the sound off said reflection surface at a specular bounce point and thus create for a listener the perception that the sound originates from a sound impression area of said reflection surface.

11 Claims, 6 Drawing Sheets

LOUDSPEAKER SYSTEM FOR REFLECTION-BASED IMAGING

CROSS REFERENCES TO RELATED APPLICATIONS

The present application claims the benefit of the filing date of U.S. Provisional Patent Application Ser. No. 63/477,525, filed Dec. 28, 2022 (Dec. 28, 2022), which application is incorporated in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The present invention relates most generally to hi-fidelity audio loudspeaker systems, and more particularly to a ceiling-mounted loudspeaker systems for use in home theaters or cinemas, and still more particularly to a ceiling-mounted loudspeaker system that solves sound displacement problems by beaming sound waves from ceiling mounted sound radiating devices to acoustically reflective surfaces and bouncing the sound waves off the bounce points in a specular fashion.

Background Discussion

Loudspeaker systems for multichannel sound application such as home theaters or cinemas comprise typically five or seven "main" loudspeakers plus a low-frequency loudspeaker called a subwoofer, and some additional ceiling-mounted loudspeakers for immersive sound performance. These 5 or 7 main loudspeakers can be difficult to place within the living area of a residence or a cinema auditorium because they are visually obtrusive. Some installations have resorted to in-wall loudspeakers, mounted flush in walls, thereby making them less visible in the room. A more sophisticated approach consists of using an acoustically transparent projection screen and concealing the three front-channel loudspeakers behind the screen. Other installations have placed all their flush-mounted loudspeakers at the ceiling of the room, thereby making them virtually disappear from conscious view. This latest solution, while esthetically pleasing poses a major sonic problem. The sound emanates from the ceiling and does not correlate with the picture location. Additionally, the sound can lack in clarity as the loudspeakers are energizing the reverberant field of the upper portions of the room.

More recently, there has been a market shift from projection screens to large direct-view displays, either as arrays of smaller display devices, or as single-unit large displays. These direct-view devices do not allow the concealment of loudspeakers behind an acoustically transparent screen as stated above. The current state of the art in ceiling speakers does not serve the sound performance requirements well, as there is not only poor electro-acoustical performance, but also spatial positioning errors between on-screen action and corresponding sound locations.

SUMMARY OF THE INVENTION

The invention described herein offers the aesthetic advantages of ceiling-mounted speakers with a solution to the above-described perceived location displacement. By using sound-radiating devices that beam sound waves at the screen, or other suitable surfaces in the room, sound is reflected off the reflecting surfaces in a specular fashion, and it will thus appear to originate or emanate from the screen location, or other intended axes. This apparent location will be referred to herein as the specular bounce point. Also, with accurate control of the sound radiation beam or beams, the sound clarity is enhanced as compared to traditional ceiling-mounted systems. One challenge in this approach of directing the sound waves to a reflective surface, is that while it is relatively easy to achieve directional beaming at mid frequencies and high frequencies, it is challenging for frequencies below 1,000 Hz, as the sound wavelengths become longer than one foot, and as the directional radiating devices must therefore become unreasonably large. This invention makes use of sound radiating devices with controlled dispersion to reflect sounds off surfaces, coupled with low and mid-frequency transducers to fill out the sound spectrum without burdening the directional beaming sound radiator. The low- and mid-frequency transducers can in fact be loudspeakers adjacent to the specular bounce point, and which are fed the low frequency spectrum in order to reproduce it as a phantom image, perceived at a point near the specular bounce point.

It will be seen, therefore, that the present invention employs directional transducers of one or more of audio signal channels of a sound system installed above an audience area, flush to the ceiling in some embodiments. The transducers generate a sound field that is perceived by listeners in the audience area to originate from the walls or other surfaces around the listeners. The sound field simulates the effect of one or multiple speakers on stands or on walls, without aesthetic or visual compromises. The sound system consists of a single or a plurality of directional electro-acoustic devices, along with bass amendment transducers as needed. Each directional device produces a beam of sound aimed toward an appropriate surface. The sound along the direct path of each device to the listener is very low in level, and the sound location is therefore perceived by the listener as originating from the reflection surface.

In its most essential aspect, the present invention is an electro-acoustic system including at least one directional transducer unit configured to general a controlled sound radiation beam aimed at a reflection surface to bounce the sound off said reflection surface at a specular bounce point and thus create in a listener the perception that the sound originates from a sound impression area of said reflection surface.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
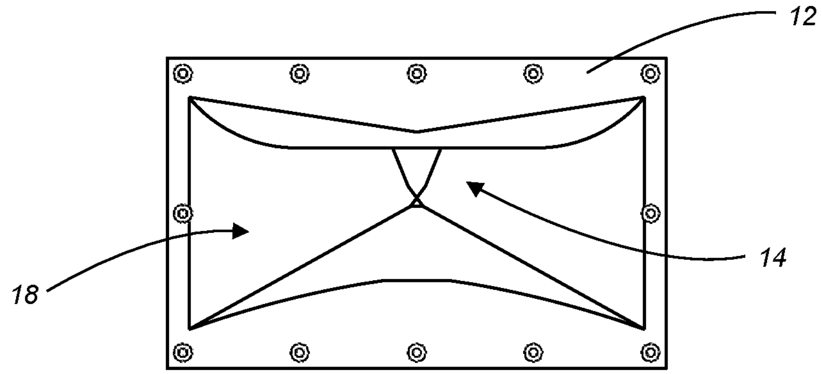
FIG. 1 is a schematic front view in elevation of a waveguide of the kind that may be incorporated into the system of the present invention.

Referring to FIGS. 1 through 13, wherein like reference numerals refer to like components in the various views, there is illustrated therein a new and improved loudspeaker system for reflection-based imaging, generally denominated 10 herein in various views.

FIG. 1 illustrates a first essential feature of the present invention, namely, an electro-acoustic transducer, which in embodiments may be a directional waveguide 12, and which when implemented in the inventive system beams sound waves to specific reflection with a controlled dispersion pattern so as to be perceived by listeners as originating from that reflection location. Of course, the sound actually originates from the electro-acoustic transducer and reaches the listener through a reflected path, much the same way that a mirror reflects light.

In embodiments, the directional waveguide may be conventional and includes a diaphragm (not shown, but well known) in a compression chamber 14 disposed immediately behind a horn throat 16, and which projects transduced signals forward and through the horn mouth 18. While shown here embodied as a waveguide, it will be appreciated that the electro-acoustic transducer and structure for guiding the sound waves to the specular bounce point can be of several types, including waveguides, planar radiators, horns, arrays of driver units, and several others.

Figure 2:
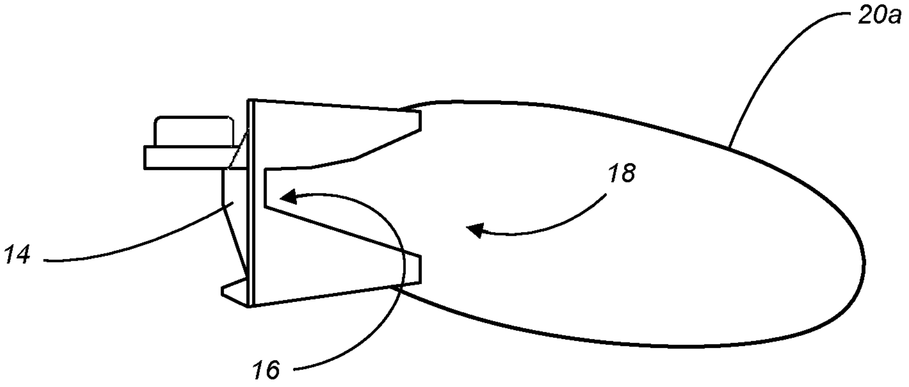
FIG. 2 is a schematic side view in elevation of the radiation lobe of sound transmitted through and out the waveguide of FIG. 1.
Figure 3:
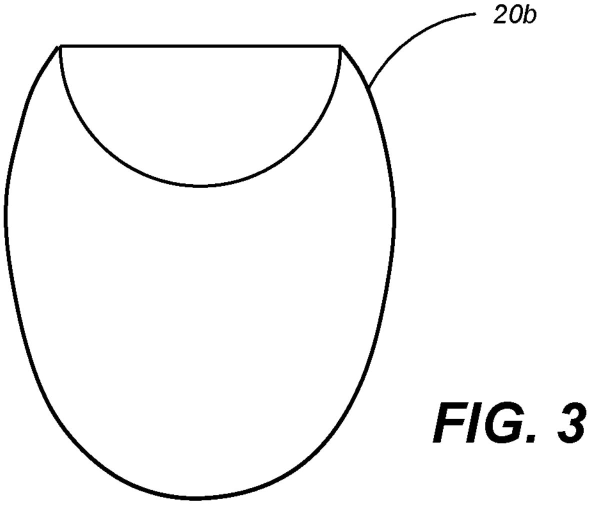
FIG. 3 is a top plan view thereof.

In embodiments, when implemented in a waveguide, the transducer has an appropriate horizontal and vertical dispersion pattern 20*a* and 20*b*, as shown in FIGS. 2-3, respectively. The horizontal dispersion beamwidth is preferably approximately 80 degrees, and the vertical beamwidth is preferably approximately 40 degrees. However, narrower or wider beamwidths may be appropriate for specific audience layouts, room configurations, or transducer locations.

Figure 4:
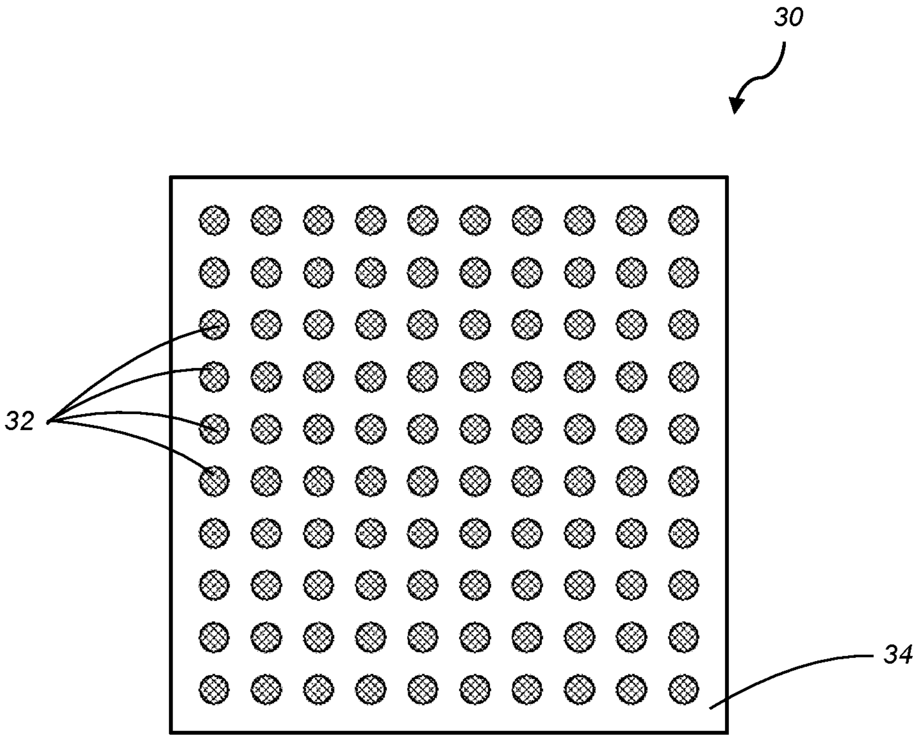
FIG. 4 is bottom view of a planar directional acoustic transducer system, configured in a 10×10 grid array of electro-acoustic driver units.
Figure 5:
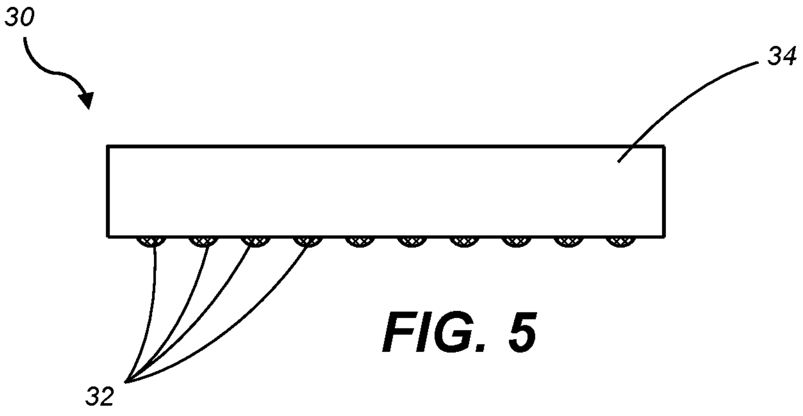
FIG. 5 is a side view in elevation thereof.
Figure 6:
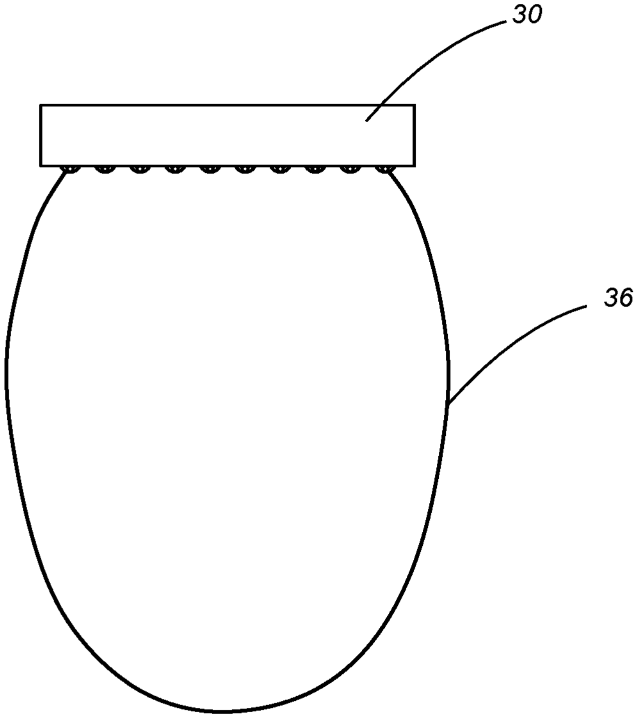
FIG. 6 is a side view in elevation of the planar directional acoustic transducer oriented as it would be in a ceiling-mounted system and showing the acoustic radiation pattern generated by the transducer system.
Figure 7:
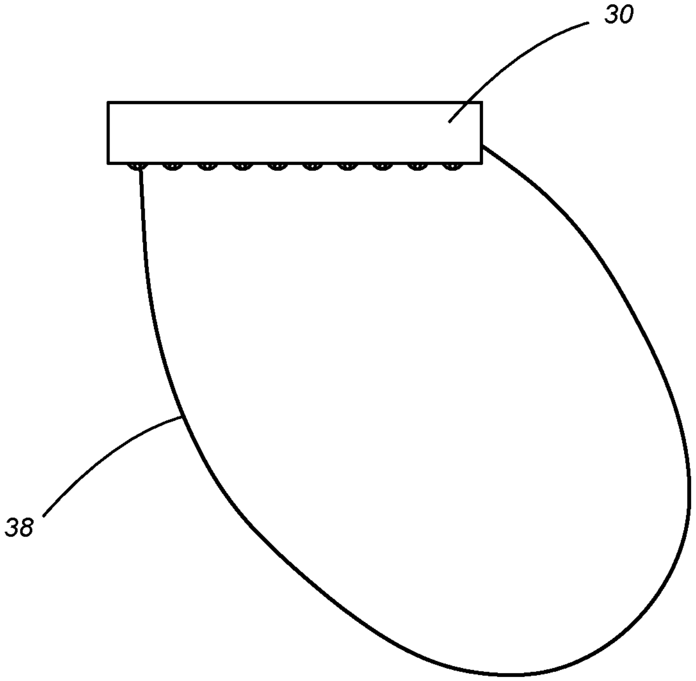
FIG. 7 shows the radiation pattern for the same system, wherein driver units are selectively delayed—here shown with right units having no delay and the delay increasing across the array towards the left.

In other embodiments, the transducer may take the form of an array of driver units with adjustable time and frequency domain characteristics. FIGS. 4-5 show a possible structure of such an embodiment, here implemented as an array transducer system 30 having a generally planar 10×10 grid of electro-acoustic driver units 32 disposed in a housing or plate 34. In such a configuration, as seen in FIG. 6, when all the driver units are fed the same signal, the generated sound radiation lobe 36 is perpendicular to the array and is largely focused and constrained to the area directly in front of the array. By contrast, and referring now to FIG. 7, when the driver units are fed signals of varying time delay, incrementing in rows from one end to the other, the sound radiation lobe 38 diverges from the perpendicular. In such instances, the main radiation axis will depend on the amount of delay applied across the array.

Figure 8:
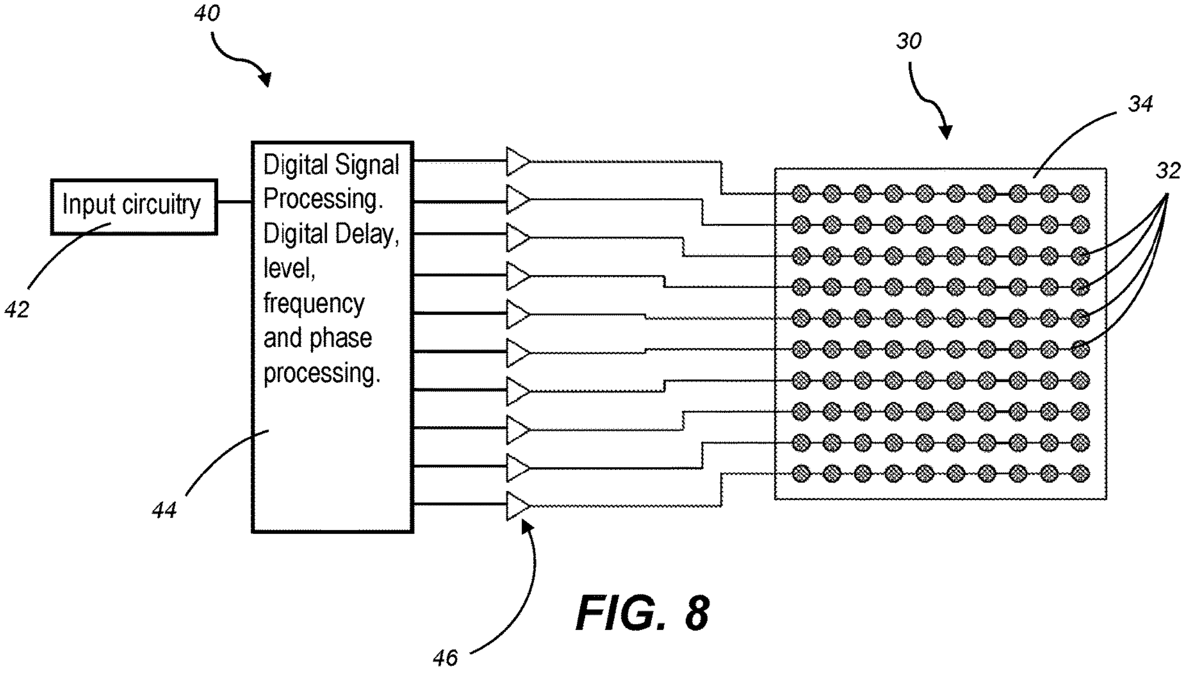
FIG. 8 is a block diagrammatic view of the functional components of an adjustable directional transducer array with directionality adjusted in one axis.

Referring next to FIG. 8, the complete array system 40 for the planar array transducer system of FIGS. 4-7 first consists of a signal input circuit 42, which feeds its signal to a digital processing section 44. This processing section provides digital delay, level, and frequency and phase processing functions, and its output is fed into an array of power amplifiers 46, the amplifier outputs going to the array of electro-acoustic transducers 32, disposed in a substantially planar configuration in the planar enclosure or plate 34. The transducer driver units are typically small devices, between 1 inch and 2 inches in diameter, and may have limited low frequency output capability. A frequency tailoring stage (equalization) may be employed to adjust the timbral character of the system.

The low frequency device(s): At low frequencies, the radiation pattern of either of the directional beaming devices tends to spread, depending on the dimensions of the waveguide, array, horn, or other transducer device. Below that frequency, some of the sound (originating in the ceiling above the listener) will radiate directly down to the listener, preceding the sound coming from the specular bounce point, and this will cause a localization error. To solve this problem, potentially problematic lower frequencies can be reproduced by one or more transducers located near but not at the specular bounce point. Features of the audience listening Title: Loudspeaker System for Reflection-Based Imaging Priority Date: Dec. 28, 2022 (Dec. 28, 2022) area, room configuration, and the like, will dictate optimal placement, but the low frequency transducers need not be precisely located in either the height or width axis. Because the total path length of the mid- and high frequency sounds from the ceiling-mounted transducer to the specular bounce point, and then to the listener, will be longer than that of the low frequency device(s), to eliminate errors in the time and frequency domains, the signal to the low frequency device(s) may need to be delayed by the corresponding difference in path length, using a programmable digital delay processor. The delay amount corresponds to the speed of propagation of sound, which is about 1.13 feet per millisecond.

Figure 9:
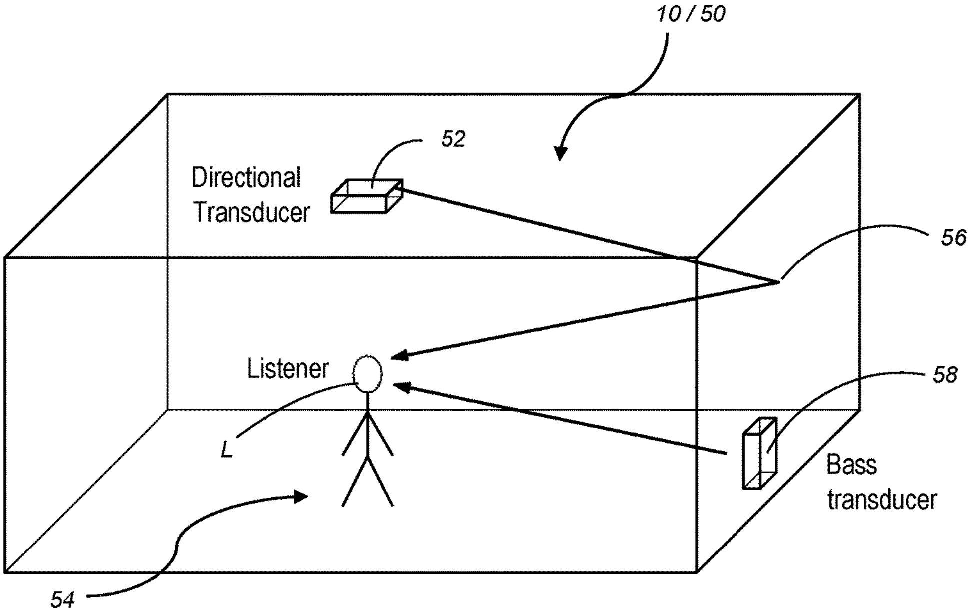
FIG. 9 is a schematic perspective view of the inventive system installed in a room and in use when implemented with a ceiling-mounted directional transducer beaming sound at a reflective wall and the sounds reflected of said wall. Here the directional transducer used in combination with a bass transducer mounted on the reflective wall.

Layout of the devices in a playback environment: Referring now to FIG. 9, for a single channel sound reproduction system 50, a directional transducer 52 is typically located directly over the audience area 54 and aimed at the intended specular bounce point 56. The sound in such an implementation appears to emanate from the specular bounce point 56. Testing and calculations show that a listener L positioned with a seated ear/eye height of 40 inches above the floor, 12 feet away from a picture screen with center located 10 degrees above eye-height, requires a Specular Bounce Point at 40+(12×12×Tan 10)=40+25=65 inches.

The directional transducer in this implementation should then be positioned 25 inches above the specular bounce point, which is 25+65=90 inches above the floor. Rasing the directional transducer results in a perceived specular bounce point that is higher than the middle of the screen, and such a consequence is acceptable within a range up to, and close to, the top of the screen. Still referring to FIG. 9, as earlier indicated, the system can be provided with a bass transducer unit 58, fed from a bass-filtered version of the sound channel, through separate signal processing and amplification devices and located and/or concealed near the intended imaging location.

For a two-channel stereo audio system, two directional devices are placed above the audience at the locations calculated to create reflections off the wall or other surfaces, as a simple extension of the single channel described above. Although the transducers are above the audience, the apparent sound sources for the two channels are at the surface location where the sound beams are aimed. A single or a pair of bass transducers can be used to amend the low frequency content and directionality, as shown above. The signal processing circuit is adjusted with level, time delay, and frequency equalization for appropriate location of the sound sources.

Figure 10:
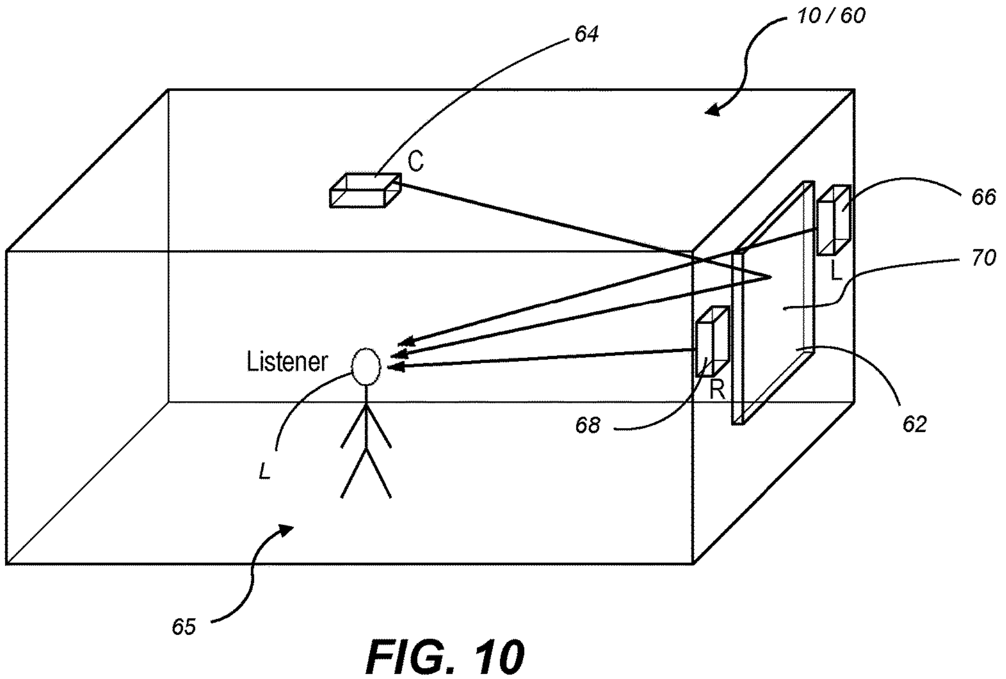
FIG. 10 is a schematic perspective view showing the system in operation and sound reflection patterns in a home theater or cinema with a multi-channel audio sound system, with the reflection-based center channel mounted above the listener area and left and right channels mounted proximate a display screen.

Referring now to FIG. 10, for an audio-video surround-sound system 60, where the center loudspeaker location is instead occupied by a video display 62, a directional transducer (waveguide, array, or other type) 64 can be located above the audience area 65, directing sound at the video display screen 62. Signals above the pattern control frequency limit of the waveguide are beamed to reflect off the video display screen so as to be perceived as coming from the video display screen by listener L. Signals below the pattern control frequency limit of the waveguide are split off to the left and right loudspeakers 66, 68, respectively, and reproduced as a phantom center 70.

Figure 11:
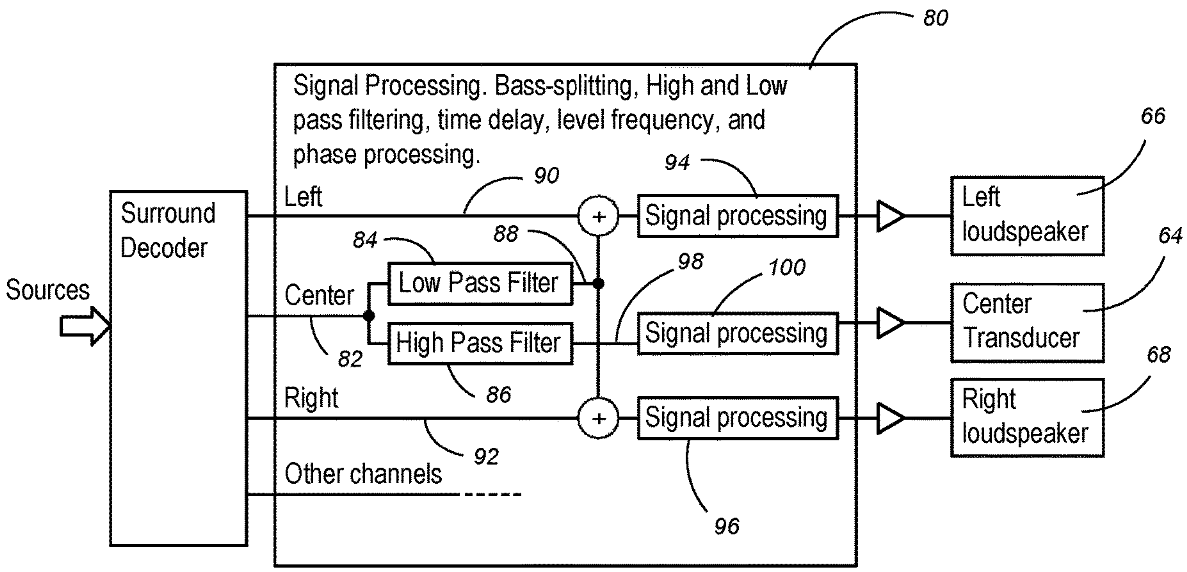
FIG. 11 is a schematic block diagram of a bass-splitting process for the center channel of FIG. 10.

The human listening spatial localization process focusses mainly on sounds in the 500 Hz to 3,000 Hz range, and if the phantom center sonic images are below 1000 Hz, the resulting overall image of the center signal will be robust. As seen in FIG. 11, a signal processing device can be utilized to handle the bass filtering, signal distribution, time alignment, and frequency and phase alignment of all the signals (See FIG. 11). The center channel signal 82 is first fed to a set of filters, one of which is a low-pass filter 84, the other of which is a high-pass filter 86. The corner frequencies of the filters are selected in the design stage of the system and are based on the wavelength capability of the directional speaker transducer to control the beam pattern. A larger unit will provide pattern control down to lower frequencies with longer wavelengths, and the filter frequency can be lowered. The output 88 of the low-pass filter is added to the left and right signals 90, 92 at a level that is typically 3 dB attenuated to account for the acoustical summation of center signal in the two left and right speakers; then, both of the left and right signals pass through a signal processor 94, 96, respectively, for room frequency response correction and time domain alignment of the system. To match the arrival times of the left, center, and right signals to the main listening position, the signal to the low frequency device(s) must be delayed by the corresponding difference in path length, using a digital delay function in the signal processor. The delay amount corresponds to the speed of propagation of sound, approximately 1.13 feet per millisecond. The output signal 98 of the high-pass filter passes through a signal processor 100 for room frequency response correction, timbral adjustment and correction, phase alignment to the low-pass signals coming out of the left/right speakers, and time domain alignment of the system.

Figure 12:
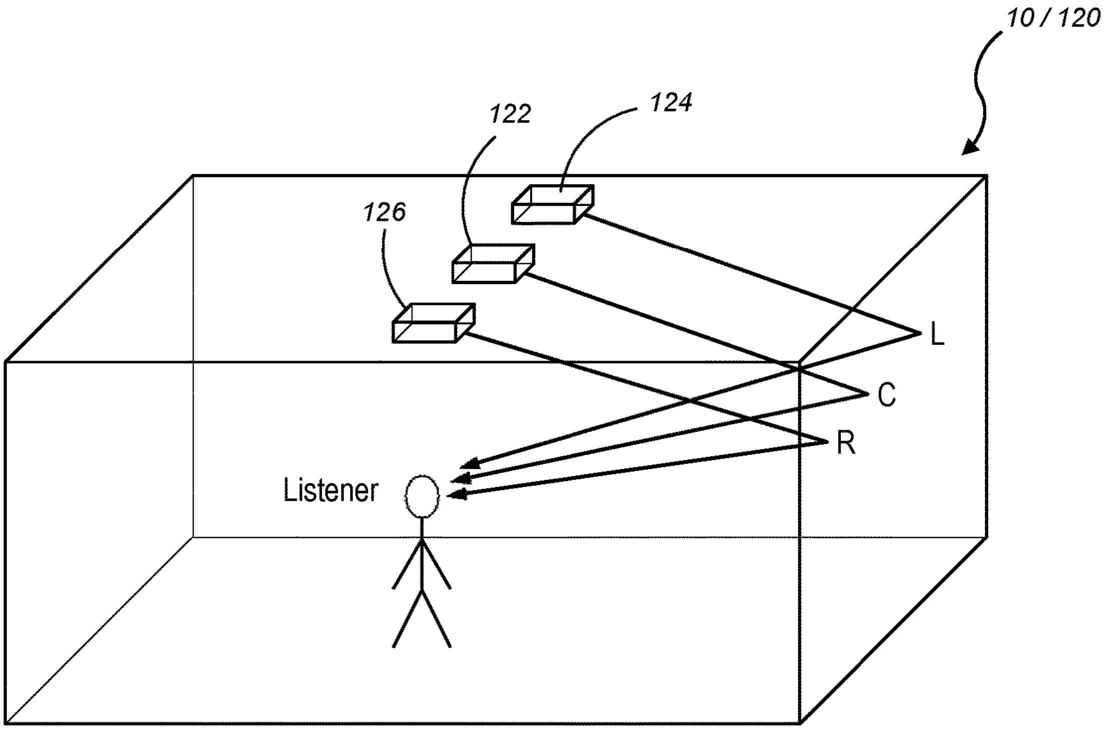
FIG. 12 is a schematic perspective view showing a multi-channel reflection-based audio system with ceiling-mounted discrete left, center, and right directional transducers directing sound to be bounced off specular reflective surfaces on a front wall.
Figure 13:
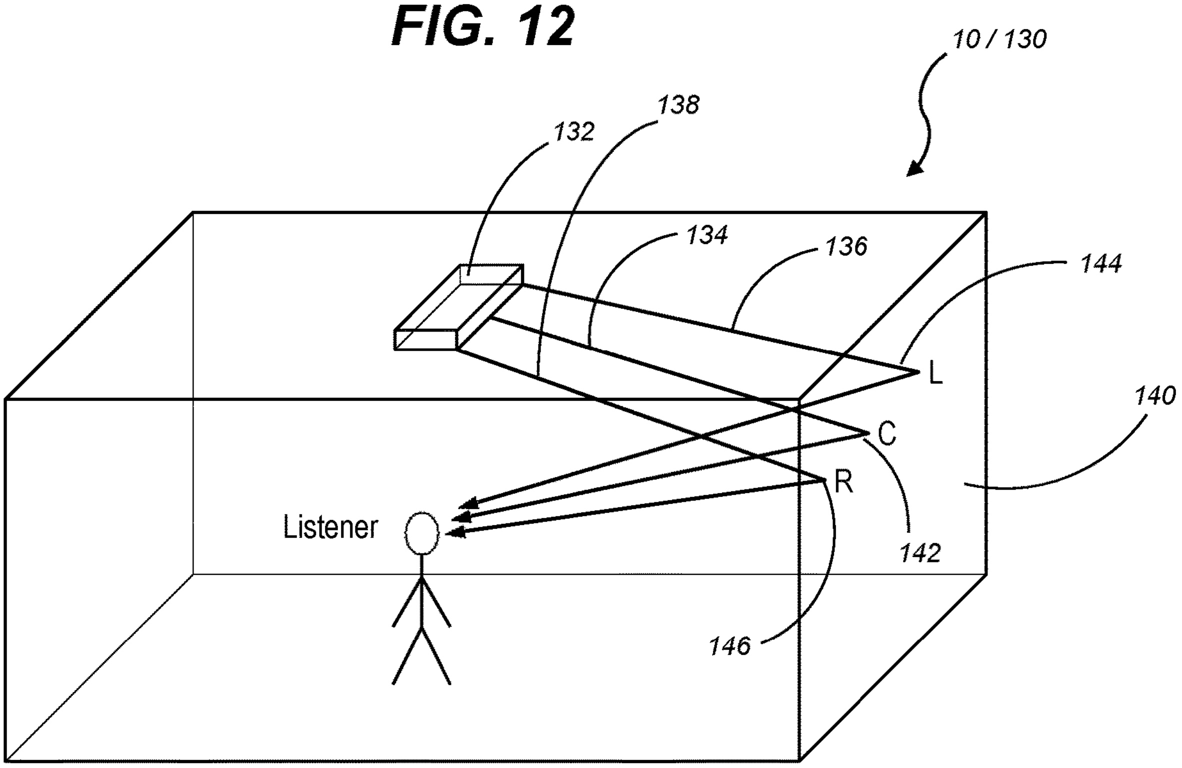
FIG. 13 is a schematic perspective view showing a multi-channel reflection-based home theater or cinema audio system with ceiling-mounted left, center, and right directional transducers in a combined unit directing discrete channel sounds to specular reflective surfaces on a front wall.

As seen in FIG. 12, a multichannel sound system 120 can be configured to use specular bounce exclusively. In embodiments, three directional transducer devices 122, 124, 126, can be used for the front channels, and a plurality of directional transducers (not shown) can be used for the surround channels. Two or more transducer arrays will be needed for "5.1" or "7.1" channel systems.

Alternatively, in still another embodiment 130, some or all the signal channels can be reproduced by one centrally located transducer 132 array fed with the source signals and programmed to beam the multiple channels 134, 136, 138, along different axes. Each axis is adjusted so as to reflect off a surface 140 at the appropriate location 142, 144, 146, respectively, to simulate a physical loudspeaker location. In a very simplified scheme, all the multi-channel sources are fed to one centrally located ceiling-mounted transducer array device, and the various beams are directed so as to appear to emanate from the proper directions. This system, too, can be amended using one or more bass transducer unit(s) fed from a bass-filtered version of the sound channel(s) through separate amplification devices and located and/or concealed near the intended imaging location(s).

From the foregoing, it will be appreciated by those with skill in the art that directional transducers of one or more of the audio signal channels of a sound system can be installed above the audience, and possibly flush to the ceiling, and generate a sound field that appears to originate from the walls or other surfaces around the listeners. The sound field simulates the effect of one or multiple speakers on stands or on walls, but without any aesthetic or visual compromises. The sound system consists of a single or a plurality of directional electro-acoustic devices, along with bass amendment transducers if and as needed. Each directional device produces a beam of sound aimed towards an appropriate surface. The sound along the direct path of each device to the listener is very low in level, and the sound location is therefore heard by the listener as emanating from the reflection surface.

The above disclosure is sufficient to enable one of ordinary knowledge and skill in the art to practice the invention and provides the best mode of practicing the invention presently contemplated by the inventor. While there is provided herein a full and complete disclosure of the various embodiments of the invention, the detailed description herein does not limit the invention to the exact construction, dimensional relationships, and operation shown and described. Various modifications, alternative constructions, changes, and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. An electro-acoustic system, comprising:

at least one directional transducer unit configured to generate a controlled sound radiation beam aimed at a reflection surface to bounce the sound off said reflection surface at a specular bounce point and thus to create in a listener the perception that the sound originates from a sound impression area of said reflection surface;

a transducer at or proximate said specular bounce point to reproduce sound signals having a wavelength longer than those that can be controlled by said directional transducer unit;

wherein said directional transducer unit conveys middle and higher frequencies of a center channel of a surround sound or immersive sound format; and wherein sound signals of wavelengths longer than those said directional transducer can effectively control in directing said sound signals to said reflection surface are reproduced by left and right channel speakers positioned on left and rights sides, respectively, of either a display screen or said sound impression area.

2. The system of claim 1, wherein the transducer is positioned on the ceiling of a room above an audience seating and listening area, and wherein said reflection surface is a vertical surface.

3. The system of claim 2, wherein said reflection surface is a wall surface.

4. The system of claim 2, wherein said reflection surface is a device disposed on a wall.

5. The system of claim 1, wherein said at least one directional transducer comprises a plurality of directional transducers for reproducing a plurality of sound images.

6. The system of claim 1, wherein said at least one directional transducer comprises a plurality of transducers for reproducing a plurality of sound images.

7. An electro-acoustic system, comprising at least one directional transducer unit configured to direct a controlled beam of sound radiation at a reflection surface to bounce the sound off said reflection surface at a specular bounce point;

wherein said at least one directional transducer is a plurality of electro-acoustic transducer driver units disposed in a generally planar grid array of rows and columns of electro-acoustic transducer driver units; and wherein said electro-acoustic driver units in said planar grid array may be selectively configured to take the same input signal to generate a sound radiation lobe generally perpendicular to the array or alternatively fed signals of varying time delay, incrementing in said rows and across said columns from one end of said rows to another end of said rows so as to generate a sound radiation lobe that diverges from perpendicular to said array.

8. The system of claim 7, wherein said electro-acoustic driver unit is ceiling-mounted includes a signal input circuit that feeds signals to a digital processing section that provides digital delay, level, frequency, and phase processing functions and outputs a signal to an array of power amplifiers having outputs to said plurality of electro-acoustic driver units.

9. The system of claim 8, wherein said electro-acoustic driver units are between 1 inch and 2 inches in diameter and have limited low frequency output.

10. The system of claim 9, further including at least one low frequency transducer located near but not necessarily at said specular bounce point, wherein lower frequencies at or below the frequency output of said electro-acoustic driver units can be reproduced by said one or more low frequency transducers located near but not at said specular bounce point.

11. The system of claim 10, further including a programmable digital delay processor, wherein said programmable digital delay processor is configured to provide signals to said low frequency transducers at a time delay corresponding to the difference in the total path length of mid- and high frequency sounds from said ceiling-mounted electro-acoustic transducer to the specular bounce point and then to the listener, and that of the path length from said low frequency transducer to the listener, multiplied by the speed of sound.

* * * * *